US009845034B1

(12) United States Patent
Lew

(10) Patent No.: US 9,845,034 B1
(45) Date of Patent: Dec. 19, 2017

(54) DISPOSABLE SEAT COVER AND ASSOCIATED METHODS

(71) Applicant: Aaron Lew, Melbourne, FL (US)

(72) Inventor: Aaron Lew, Melbourne, FL (US)

( * ) Notice: Subject to any disclaimer, the term of this patent is extended or adjusted under 35 U.S.C. 154(b) by 0 days.

(21) Appl. No.: 14/693,655

(22) Filed: Apr. 22, 2015

Related U.S. Application Data

(60) Provisional application No. 61/982,630, filed on Apr. 22, 2014.

(51) Int. Cl.
| | |
|---|---|
| *A47C 27/00* | (2006.01) |
| *A47C 31/00* | (2006.01) |
| *B60N 2/60* | (2006.01) |
| *B64D 11/06* | (2006.01) |
| *G09F 23/00* | (2006.01) |
| *B60N 2/58* | (2006.01) |

(52) U.S. Cl.
CPC ............. *B60N 2/6081* (2013.01); *B60N 2/60* (2013.01); *B64D 11/06* (2013.01); *G09F 23/00* (2013.01); *B60N 2/58* (2013.01); *B60N 2/5816* (2013.01); *B60N 2/6018* (2013.01); *B64D 11/0627* (2014.12); *B64D 11/0629* (2014.12); *G09F 2023/005* (2013.01)

(58) Field of Classification Search
CPC .......... B60N 2/6081; B60N 2/60; B60N 2/58; B60N 2/5816; B60N 2/6018; B64D 11/06; B64D 11/0629; B64D 11/0627; G09F 2023/005
USPC ...................................... 297/219.1, 225, 228
See application file for complete search history.

(56) References Cited

U.S. PATENT DOCUMENTS

| | | | |
|---|---|---|---|
| 3,654,059 A | 4/1972 | Zisblatt | |
| 4,621,004 A | 11/1986 | Madsen | |
| 4,676,376 A * | 6/1987 | Keiswetter | B60N 2/60 206/449 |
| 4,840,841 A | 6/1989 | Madsen | |
| 5,005,901 A * | 4/1991 | Hinde | B60N 2/6036 297/220 |
| D331,682 S | 12/1992 | Jones | |
| 5,275,463 A * | 1/1994 | Rocha | A47C 31/11 297/188.01 |
| 5,664,832 A * | 9/1997 | Stevens | A47C 31/11 297/225 |
| 5,707,107 A * | 1/1998 | Melone | B60N 2/6027 297/228.1 |
| 5,709,431 A * | 1/1998 | Horn | B60N 2/6063 297/219.1 |
| 6,279,993 B1 * | 8/2001 | Berthiaume | B60N 2/6063 297/219.1 |
| 6,309,017 B1 * | 10/2001 | Middleton | A47C 31/113 297/219.1 |
| D465,959 S * | 11/2002 | Cameron | D6/611 |

(Continued)

*Primary Examiner* — Chi Q Nguyen
(74) *Attorney, Agent, or Firm* — Stephen G. Anderson; GrayRobinson, P.A.

(57) ABSTRACT

A seat cover including an elongate body sheet for placement between a user and a seat is provided. A pair of arm protectors extend laterally from sides of an intermediate portion of the seat cover. The arm protectors provide a barrier between the user and armrests. An adhesive strip is integrally formed with a back surface of the seat cover and proximate an upper portion binds the cover to the seat. A pocket is integrally formed with a front lower surface of the seat cover for storing a sanitizer container.

18 Claims, 10 Drawing Sheets

(56) References Cited

U.S. PATENT DOCUMENTS

| | | | |
|---|---|---|---|
| 6,634,709 B1 * | 10/2003 | Hetherington | A47C 31/11 297/225 |
| 6,676,209 B1 * | 1/2004 | Szabo | B60N 2/60 297/188.01 |
| 6,817,663 B1 * | 11/2004 | Stuart | A47D 15/006 297/219.1 |
| 6,851,131 B1 * | 2/2005 | Adams | A47K 13/14 4/245.1 |
| D506,101 S | 6/2005 | Rains | |
| 7,156,458 B2 * | 1/2007 | Hanberg | A47D 15/006 297/219.1 |
| 7,340,813 B2 * | 3/2008 | Hampton | A47C 7/24 29/91 |
| 7,374,240 B2 | 5/2008 | Gold et al. | |
| 7,422,288 B2 * | 9/2008 | Ahearn | A61G 15/12 297/227 |
| 7,600,813 B2 * | 10/2009 | Lanham | B60N 2/6018 297/219.1 |
| 7,607,732 B2 | 10/2009 | Beroth et al. | |
| 7,841,658 B1 * | 11/2010 | Marble | B60N 2/4879 150/158 |
| 7,959,227 B2 * | 6/2011 | Miller | A47C 31/11 297/224 |
| 8,458,873 B2 | 6/2013 | McConnell et al. | |
| 8,733,837 B2 * | 5/2014 | Weinstein | A47C 31/113 297/228 |
| 2003/0085598 A1 | 5/2003 | Monday | |
| 2006/0282056 A1 * | 12/2006 | McDonald | A61F 13/505 604/385.13 |
| 2009/0220177 A1 * | 9/2009 | Andreu | A45C 7/0095 383/105 |
| 2009/0222334 A1 * | 9/2009 | Shepherd | G06Q 30/0241 705/14.4 |
| 2011/0198904 A1 | 8/2011 | Thomas et al. | |
| 2012/0019031 A1 * | 1/2012 | Bessert | A61G 5/10 297/219.1 |
| 2013/0187420 A1 * | 7/2013 | Weinstein | A47C 31/113 297/227 |
| 2014/0265483 A1 * | 9/2014 | Miller | A47C 31/11 297/228 |
| 2015/0040301 A1 * | 2/2015 | Smith | A45F 5/00 4/239 |

* cited by examiner

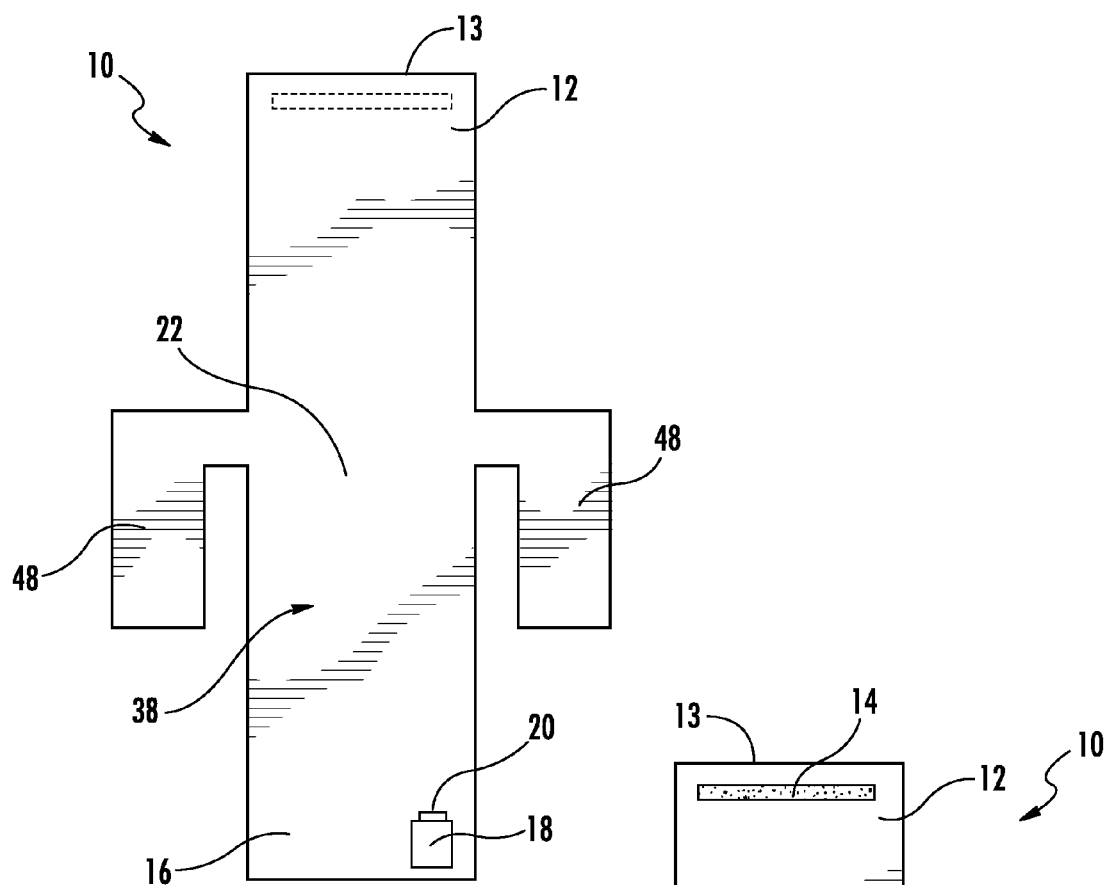
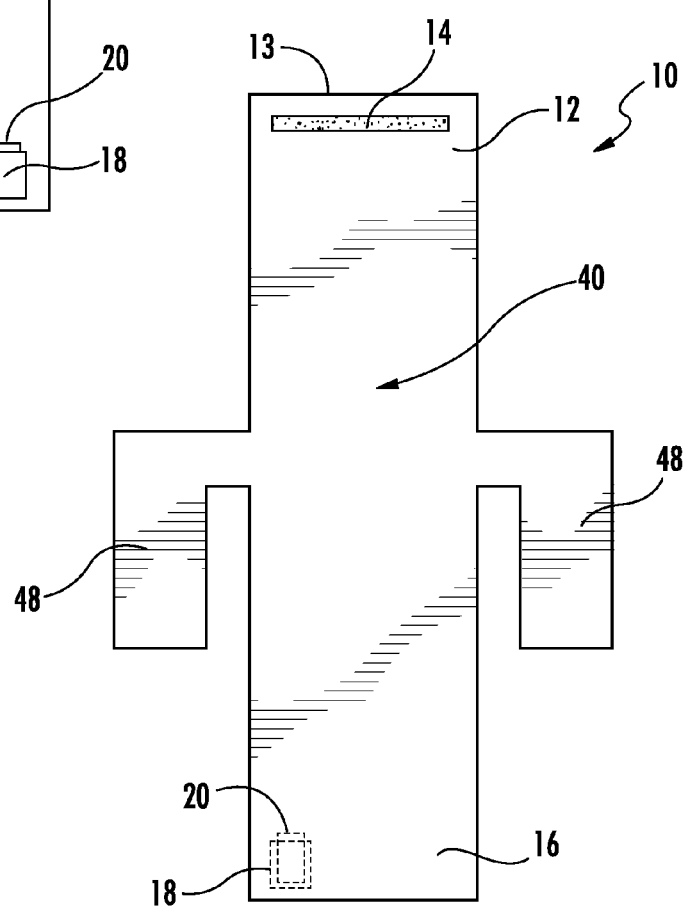

DISPOSABLE SEAT COVER AND ASSOCIATED METHODS

CROSS REFERENCE TO RELATED APPLICATIONS

This application claims priority to U.S. Provisional Application Ser. No. 61/982,630 filed Apr. 22, 2014 entitled "Disposable Seat Cover," the contents of which are incorporated by reference herein for all purposes.

FIELD OF INVENTION

This disclosure generally relates to seat covers for use on public seating, such as by a passenger on an airplane, bus, train, boat, or other public transportation, and in particular to seat covers providing a barrier between the passenger and the seat to minimize contact with germs and dirt.

BACKGROUND

Covers for seats and furniture, such as slip covers, have been provided to protect the furniture. Many of these covers are ill-fitting and drape the furniture. Other covers for seats, which have been provided to protect a user, include that described in Patent Application Publication WO 2008033122 A1 to Berge, which discloses an airplane seat cover constructed from fabric and comprising a hood that slips over the entire top portion of an airplane seat. This known seat cover, which is intended to be carried and reused by the user, can collect and transmit germs and dirt when carried on, used and carried off of a public transport such as a plane.

One deficiency of this, and other hooded seat covers, is that they are configured to secure to a seat in a manner that extends beyond the seating space of the passenger and into and over the back of the seat. Hooded seat covers interfere with other travelers' personal space, and, significantly obscure and interfere with entertainment screens affixed to or built into a rear portion of the seat for viewing by the rearward passenger. Existing covers have also been configured in a manner that leaves the armrests exposed and uncovered in a manner that subjects the passenger to dirt and germs from prior users.

SUMMARY

There remains a need in the art for a seat cover that is disposable and equipped with a barrier to resist transmittal of dirt and germs from prior users of a seat to a passenger using the seat cover. Further, there remains a need for a seat cover that is configured to cover a passenger's sitting area in a manner that does not extend beyond the sitting area of the passenger and may cover the seat and the armrests, including movable armrests. Thus, a need exists for a disposable seat cover capable of effectively protecting a traveler from the numerous health hazards associated with airplane travel that is easy to use, portable, disposable, and does not disrupt fellow passengers. Further, there is a need for a seat cover that is available to be used with a variety of transportation modes, including trains, airplanes, automobiles, ferries, cruise ships, gondolas, and other forms of public transportation. The embodiments disclosed herein are aimed at meeting these and other needs in the art.

The teachings of the present disclosure provide a seat cover for a transportation seat and a method for establishing a disposable barrier between an airline seat and a passenger. Embodiments herein presented serve to ensure clean and sanitary airplane travel by providing a seat cover that provides a clean and germ free seating area for a traveler to provide a barrier and protect the passenger from contact with dirt, germs, chemicals or other environmental hazards that might be present on public seating, such as on airplanes, trains, buses, stadiums and theaters. One embodiment includes a disposable seat cover. Another advantage of the seat cover of the present disclosure is that it provides a passenger with a sanitary local travel environment without interfering with other passengers' travel space. Yet another advantage of the present invention is that it can be substantially confined to the passenger's own travel zone. In one embodiment, the seat cover also provides a germ barrier between a passenger and the auxiliary portions of the seats including the armrests and entertainment consoles associated with certain public seating such as airplane, train or bus seats, thereby leaving a passenger feeling fresh, clean, and protected from dirt and/or germ transmission after traveling.

In one embodiment, a seat cover is provided that protects an airplane passenger from transmission of and/or contact with dirt, germs, chemicals, toxic substances or liquids, ink and other environmental hazards on airplane seats. The seat cover is portable, and capable of being folded into a substantially smaller compact form for carrying in a small pouch or other carrying enclosure prior to use. The embodiments described herein can be used for a range of public seats, including but not limited to airplanes, ferry, ship, bus, train, theater, stadium and auditorium seats or any other public seat that can harbor germs or dirt.

In another embodiment, the seat cover may comprise an elongated body portion in the form of a sheet that is configured to generally conform to and cover the sitting surface of an airplane seat mounted to an airplane floor. The seat cover may include arms which extend laterally from opposite middle portions of the body portion to cover associated armrests of the seat. The body portion is proportioned to extend from the top of the seat distal to the airplane floor to the bottom front of the seat base and proximal the airplane's floor. Alternatively, the body portion is proportioned to extend from the top of the seat to just beyond the seat's sitting portion. The sheet may be constructed from a variety of materials, including non-woven materials, medical fabrics such as the Gore® medical fabrics, coated paper or other materials that are disposable, lightweight, and water resistant or water repellant. The paper or laminated paper material may comprise woven fibers or a material similar to that used in medical gowns, shoe covers, and disposable face masks that is easily folded and compactable for storage in a small portable pouch. Alternatively, the seat cover material comprises a nonwoven fabric. One embodiment comprises a seat cover provided as a kit including several disposable seat covers in a single pouch or container. Alternatively, a kit comprises a single disposable seat cover in a single pouch. A kit may also include an additional cover adapted to be fit over a tray table and/or sanitizer for cleaning a surface.

The disposable sheet may also include a pair of armrest covers extending laterally from the sides of the generally rectangular sheet. In one embodiment, the armrest covers drape over the airplane seat's armrests, serving as a barrier between the armrests and a passenger's arms and hands. In another embodiment of the invention, the armrest covers comprise a pair of tubular structures for sliding over the respective ends of a pair of armrests. In yet another embodiment of the present invention, the armrest covers comprise narrow, generally rectangular strips attached near one end to the rectangular sheet.

In one embodiment, the sheet attaches to the top of the seat back or headrest by an adhesive strip. The adhesive strip may include a glue or other adhesive substance that is capable of easy removal without damage (i.e. the leaving behind of residue, etc.) to the covered seat. Adhesive strips may also be used to secure the armrest covers to the armrests. Prior to attachment to an airline seat, the adhesive strip may be covered by a strip of paper to prevent the adhesive from sticking to other portions of the seat cover prior to use. In an alternate embodiment, the seat cover attaches to the seat back and/or the armrests using Velcro® or other commercially available hook and loop fastening system. The hook portion may be permanently or removeably fastened to the seat to receive and connect with a loop portion attached to the seat cover. The hooks and loops can also be reversed, with the hooks connected to the seat cover and the loops attached to the seat. The Velcro® armrest connections may include long strips of Velcro® that may be attached at various locations to achieve maximum adjustability and fit on different seat models. Other common methods of attachment are also within the scope of the present disclosure.

In one embodiment, the packaging of the sheet may include a pouch containing a sanitizing wipe, gel, or other fluid that the passenger may use to sanitize the passenger's hands, face, tray table and seatbelt buckle. In other embodiments, the sheet may include a pocket or a pouch for accommodating a sanitary wipe or sanitizing fluid or gel. The pouch is preferably positioned near the end of the protective seat cover proximate the floor of the airplane for convenient access by a passenger, however other locations and orientations are considered to be within the scope of the present disclosure. The various components of the present invention, and the manner in which they interrelate, are described in greater detail hereinafter.

BRIEF DESCRIPTION OF DRAWINGS

For a more complete understanding of the present disclosure and its advantages, reference is now made to the following description, taken in conjunction with the accompanying drawings, in which:

FIG. 6 is a front plan view of an alternate embodiment of a seat cover in an extended position according to the teachings of the present invention;

FIG. 7 is a rear plan view of the embodiment of FIG. 6;

DETAILED DESCRIPTION OF EMBODIMENTS

Embodiments of the present invention will now be described more fully hereinafter with reference to the accompanying drawings, in which embodiments are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
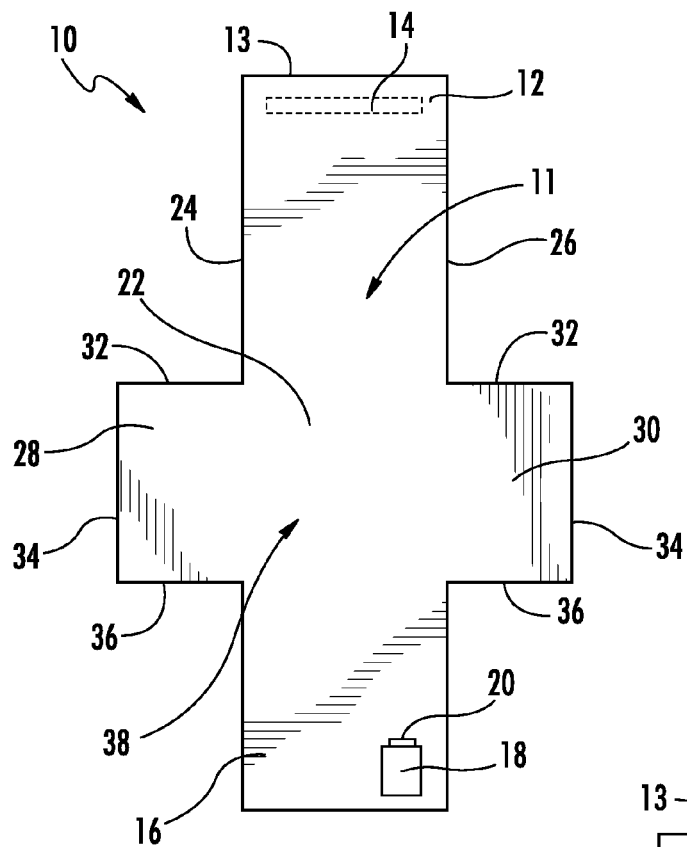
FIG. 1 is a front plan view of a seat cover in an extended position according to the teachings of the present invention.
Figure 2:
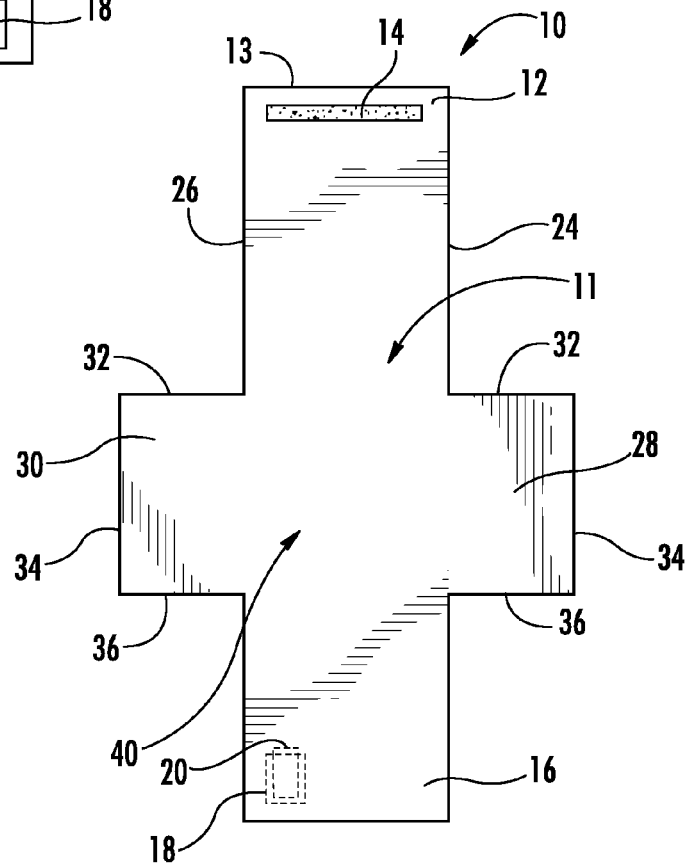
FIG. 2 is a rear plan view of the embodiment of FIG. 1.

With reference initially to FIGS. 1 and 2, one embodiment includes a seat cover 10 comprising an elongate body 11 formed as a sheet that is configured to generally conform to and cover the sitting surface of a seat, shown as an airplane seat 102 in the system depicted in FIGS. 3 and 4 (described in greater detail hereinafter). The seat cover includes a front surface 38 for contacting a user and a back surface 40 opposite the front surface for contacting a seat 102 (see FIGS. 3 and 4). The body 11 comprises an upper portion 12, a lower portion 16 opposite the upper portion 12, and an intermediate portion 22 therebetween. The body is proportioned to extend from the top of a seat distal from the airplane's floor to the bottom front of the seat base and proximal the airplane's floor. Alternatively, the body 11 is proportioned to extend from the top of a seat to just beyond the lower edge of the seat's sitting portion.

One embodiment of the seat cover 10 further comprises a pair of arm protectors 28, 30 extending laterally from opposite sides 24, 26 of the body 11 in the intermediate portion 22. Alternatively, the seat cover further comprises at least one arm protector. A single arm protector is also within the scope of the present disclosure. The arm protectors 28, 30 extend laterally from opposite middle portions of the body 11 portion to cover associated armrests 44, 46 of the seat 102. As shown in FIGS. 3 and 4, the arm protectors 28, 30 can be extended from the body portion 11 to cover arm rests 44, 46 of a seat 102 to provide a barrier with the seat arm rests. The arm protectors 28, 30 each have a top extent 32, a bottom extent 36, and a side extent 34 therebetween. As shown in FIGS. 1 and 2, the top extents 32 are generally parallel to the bottom extents 36, and the side extents 34 are generally perpendicular to both the top extents 32 and the bottom extents 36. Further, the side extents 34 are generally parallel to the left and right sides 24, 26 of the intermediate portion 22. The arm protectors 28, 30 provide a barrier between the user and a pair of armrests 44, 46.

Figure 8:
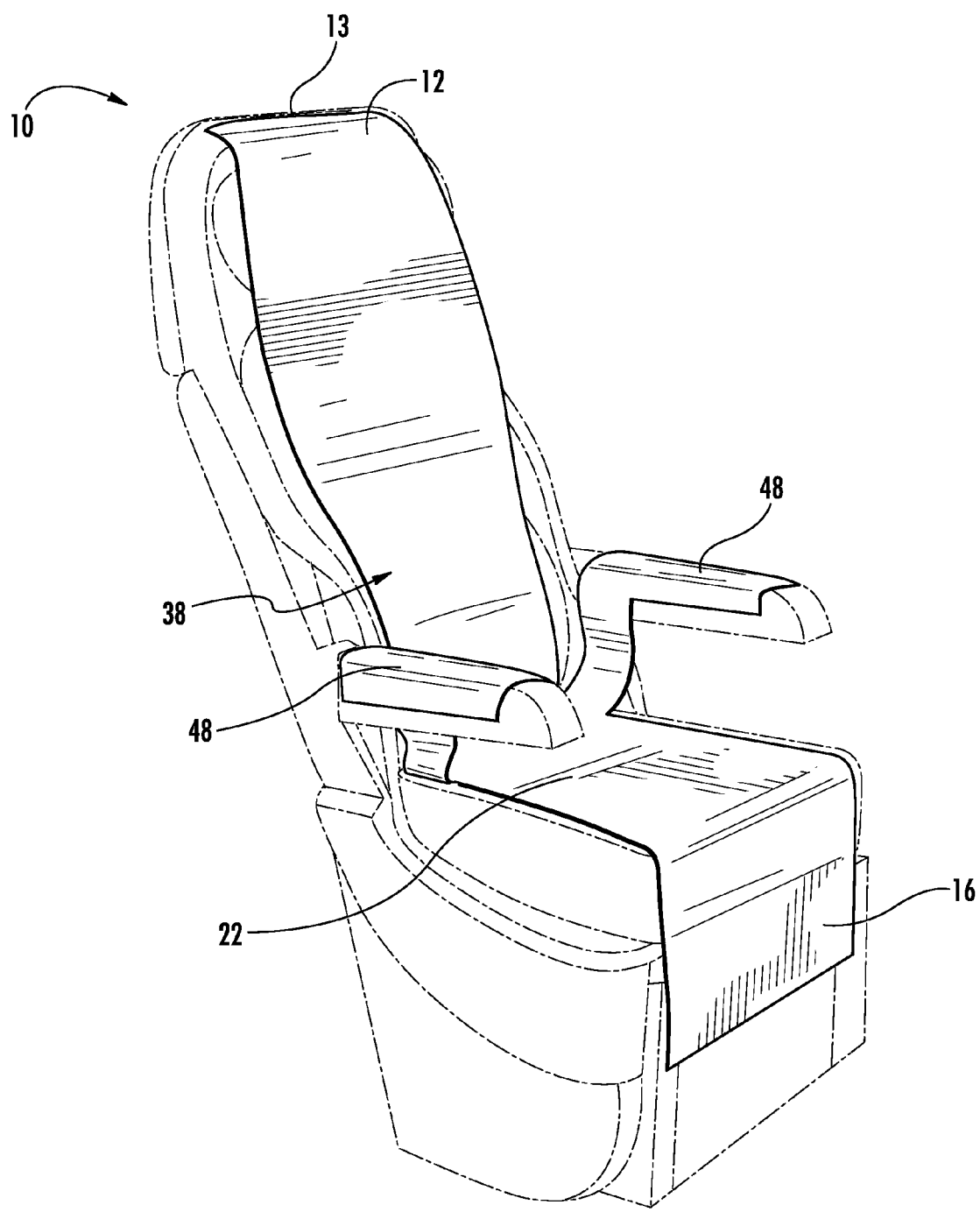
FIG. 8 is a front perspective view of an embodiment of FIG. 6 illustrating the seat cover positioned on the seat.

In an embodiment depicted in FIGS. 6-8, the arm protectors comprise elongated strips 48 attached to the body at intermediate portion 22. Alternatively, the arm protectors comprise elongated strips 48 attached to the body at the upper portion 12. This alternative configuration helps to minimize disruption of the arm protector's contact with the seat's armrest upon sitting on the intermediate portion 22.

Figure 9:
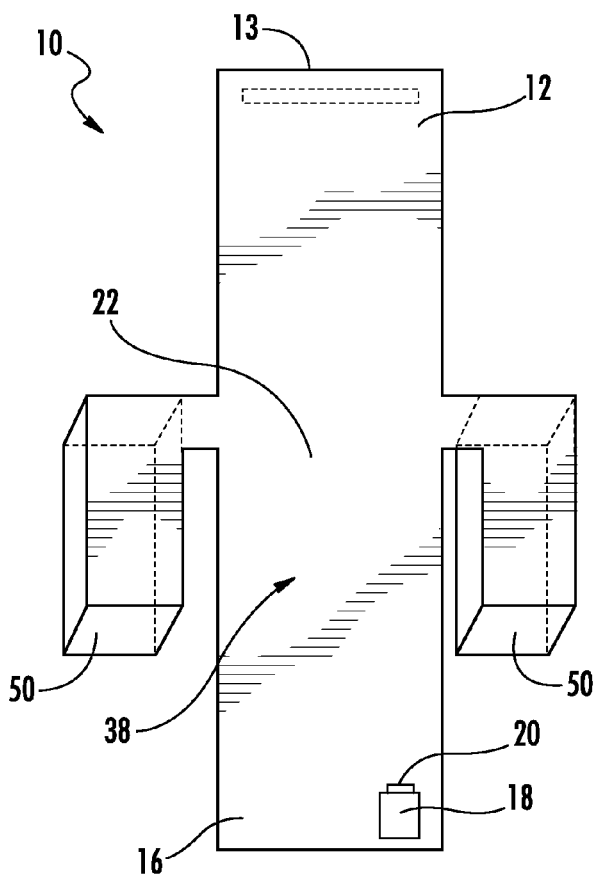
FIG. 9 is a front perspective view of a second alternate embodiment of a seat cover according to the teachings of the present invention.
Figure 10:
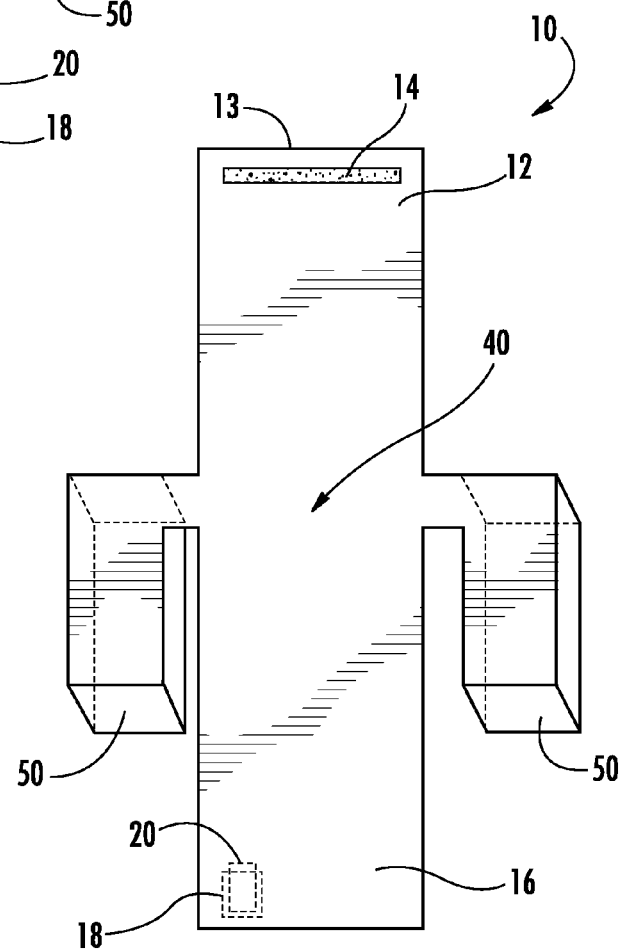
FIG. 10 is a rear perspective view of the embodiment of FIG. 9.
Figure 11:
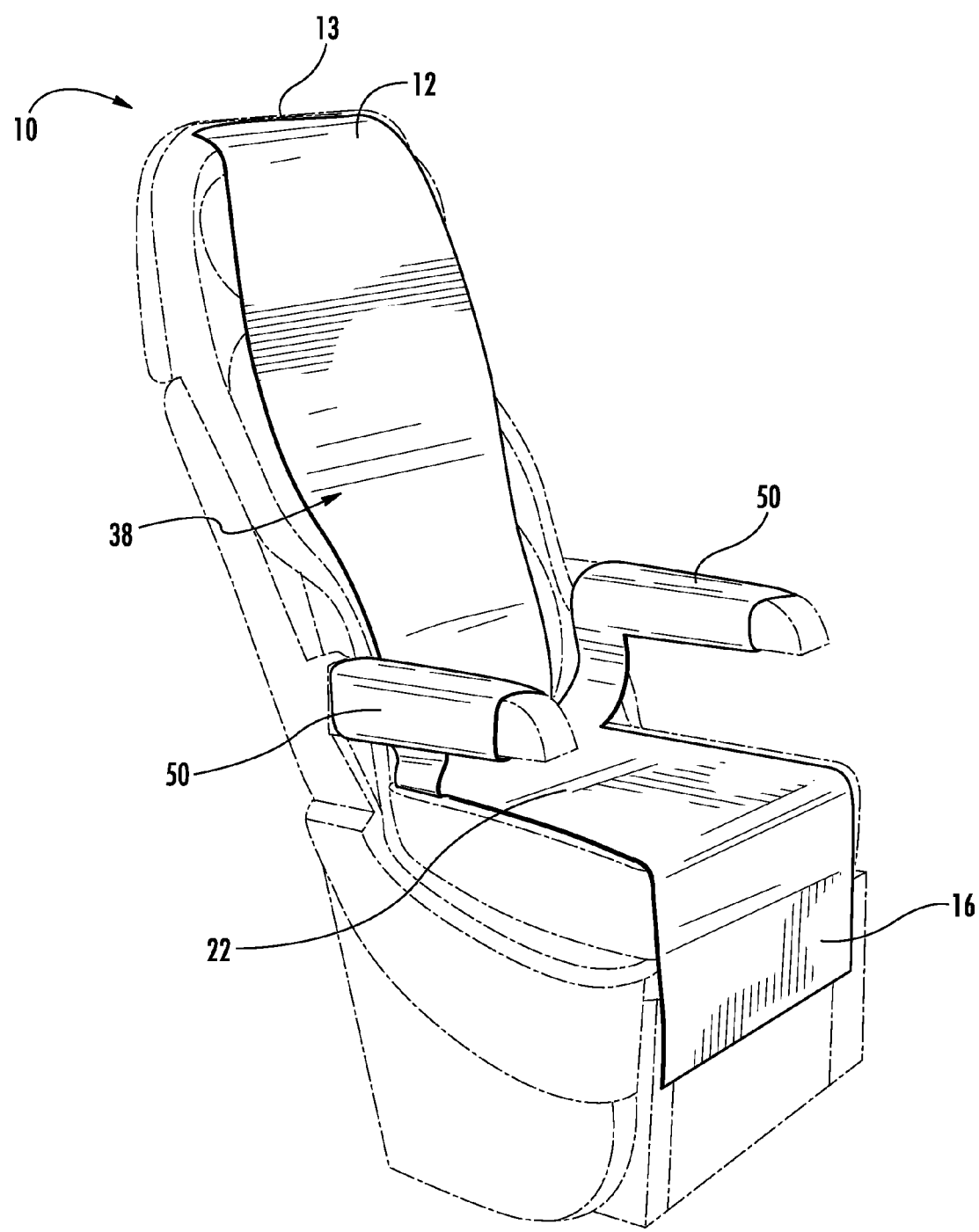
FIG. 11 is a front perspective view of an embodiment of FIG. 9 illustrating the seat cover positioned on the seat.

Further, the arm protectors can be provided as sleeves in combination with the sheet. For example, in another embodiment shown in FIGS. 9-11, the arm protectors comprise tubular extensions 50 that each receive an armrest for covering the arm rest and further securing the cover to a sheet.

In one embodiment of the present invention, the seat cover includes an adhesive strip 14 or other removable connection means formed along the back surface 40 and proximate the upper portion 12, the adhesive strip comprising a removable adhesive for removeably binding the cover 10 to the seat 102. The adhesive is positioned with respect to top edge 13 of the top portion 12 of the cover 10 so as when the adhesive strip 14 is connected to the top of the seat, the upper portion 12 extends only onto the top portion of the seat 102 and does not extend beyond the rear edge of the top portion of the seat 102 and onto the rear face 109 of the seat 102, and thus does not extend into the space of the rearward passenger (see FIG. 5). The adhesive strip 14 includes a non-permanent glue or other adhesive substance that is capable of easy removal without damaging or marring the surface of the seat 102. Adhesive strips may also be used to secure the armrest covers to the armrests, the intermediate portion to the seat, and/or the lower portion to the seat.

Prior to attachment to an airline seat, the adhesive strip 14 may be covered by a strip of paper or other removable barrier to prevent the adhesive from sticking to other portions of the seat cover 10 prior to use. In an alternate embodiment, the seat cover attaches to the seat back and/or the armrests using hook and loop such as the Velcro® brand or other commercially available hook and loop fastening system. The hook and loop armrest connections may consist of long strips that may be attached at various locations to achieve maximum adjustability and fit on different seat models. Other common methods of attachment are also within the scope of the present invention.

As shown in FIGS. 1-4, the cover 10 may further comprise a pouch 18 for receiving a sanitizer 20. The pouch may be attached to the front surface 38 and preferably proximate the lower portion 16. Alternatively, the pouch may be positioned proximate at least one of the upper portion, the intermediate portion, and an arm protector.

Figure 3:
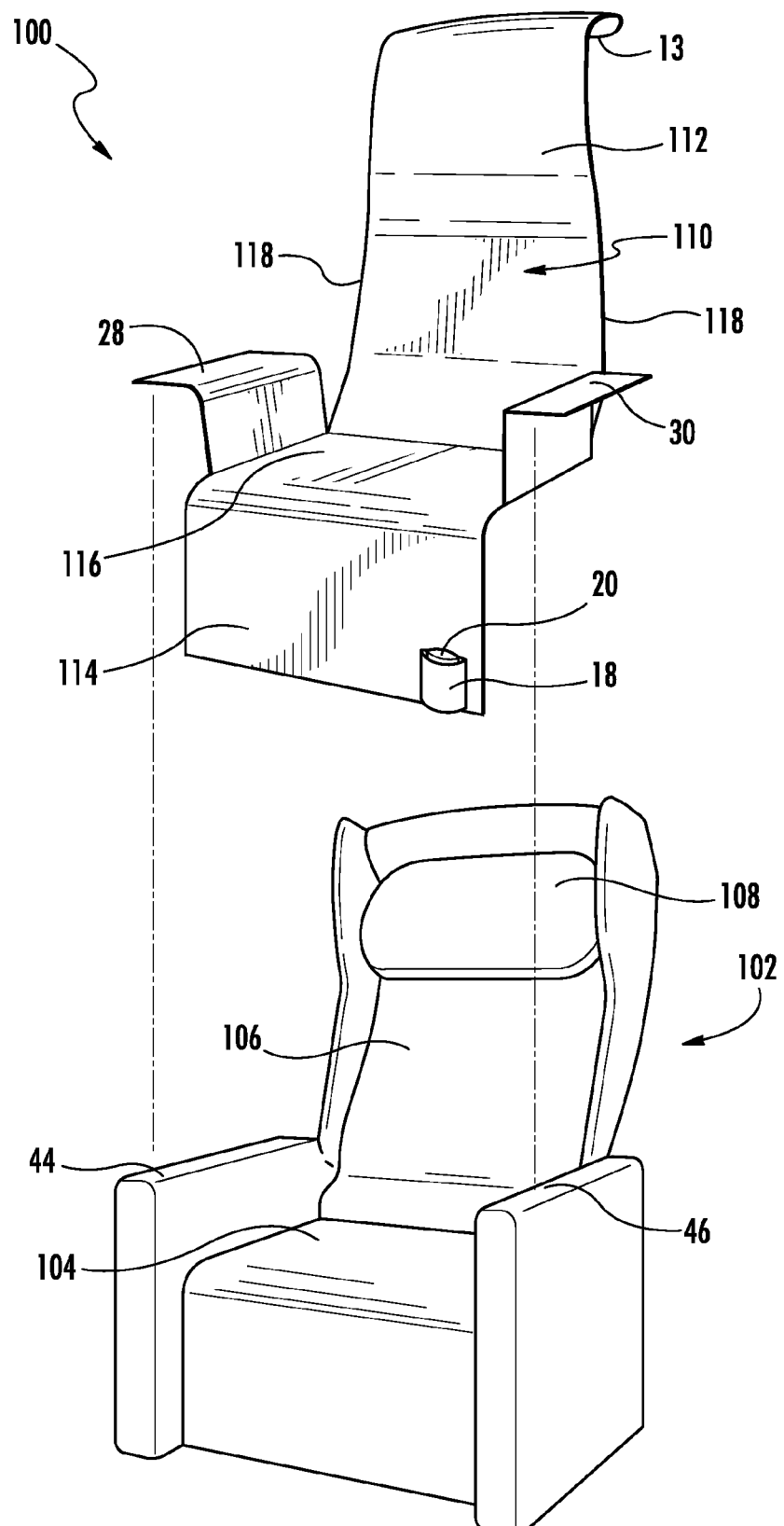
FIG. 3 is an exploded perspective view of the embodiment of FIG. 1 to be deployed with a seat.
Figure 4:
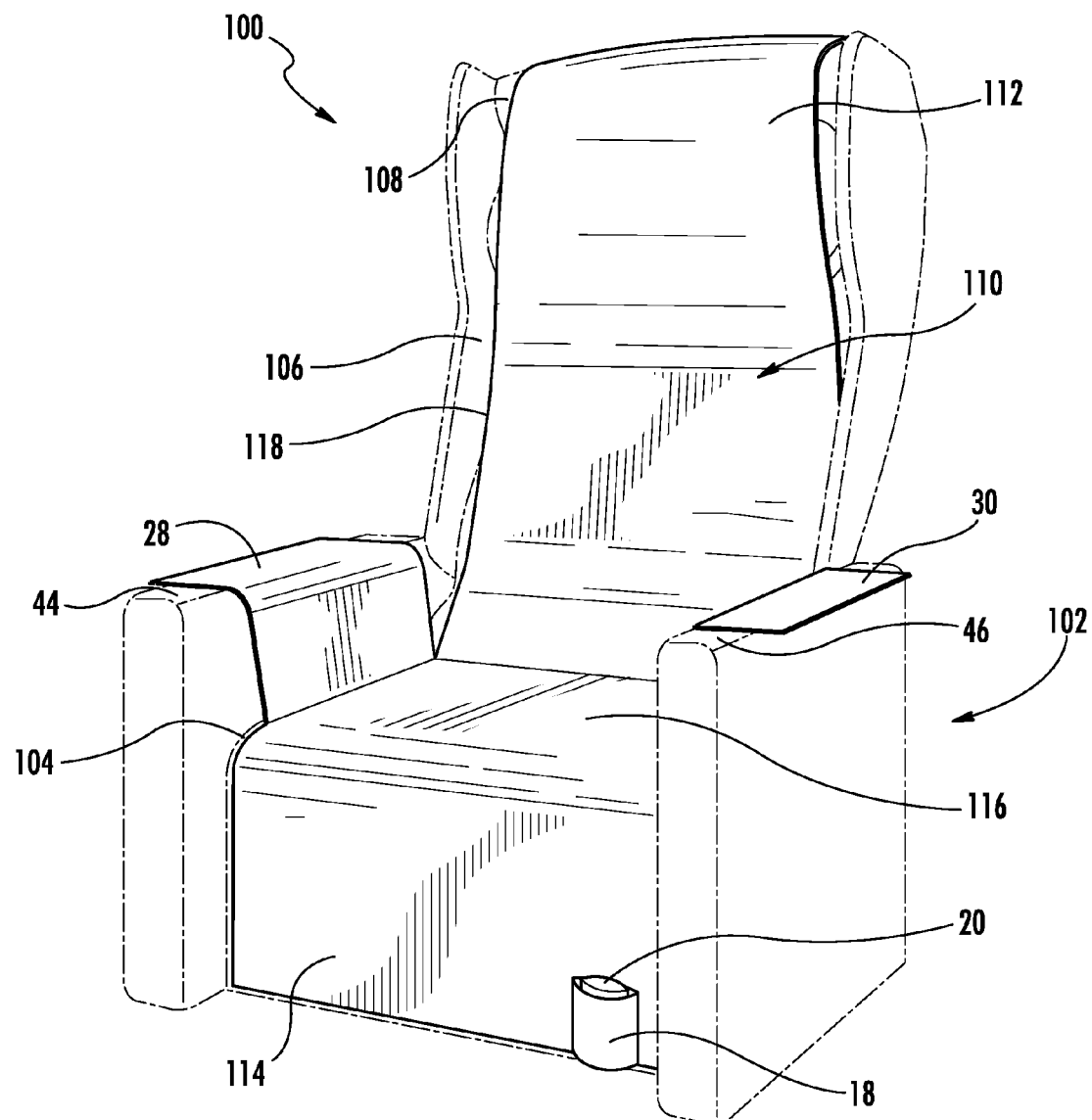
FIG. 4 is a front perspective view of the embodiment of FIG. 3 illustrating the seat cover positioned on the seat.
Figure 5:
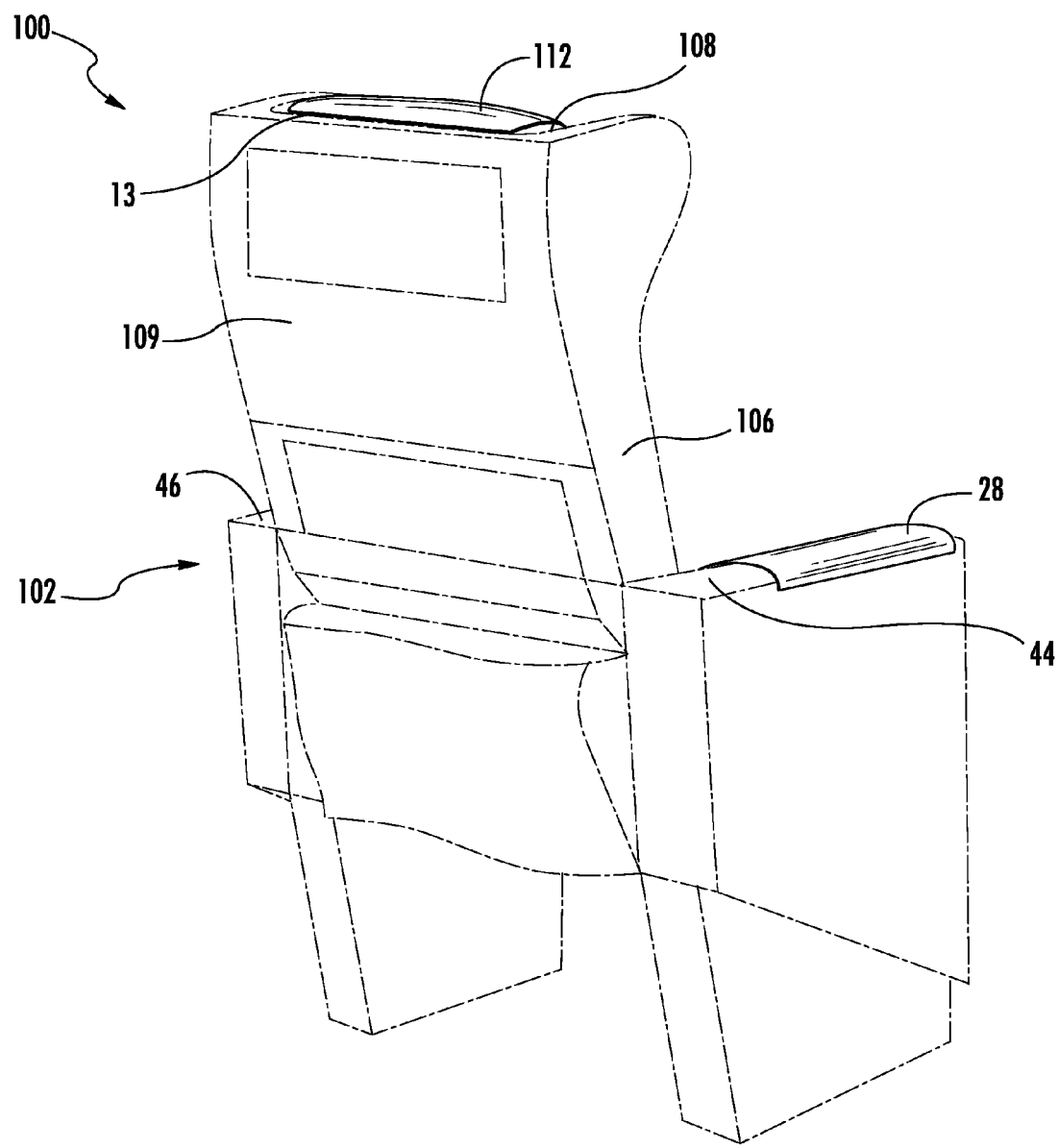
FIG. 5 is a rear perspective view of the embodiment of FIG. 4.

With continued reference to FIGS. 3-5, one embodiment of the present invention includes a system 100 for sanitary airline travel, the system comprising an airline seat 102 having a lower sitting portion 104, a backrest 106, a headrest 108, and opposing armrests 44, 46, the headrest including a front, back, and top surface, the airline seat adapted for accommodating an airline traveler.

The system 100 further comprises a disposable paper sheet 110 positioned over the airline seat 102, the sheet 110 comprising an upper extent 112 positioned over the backrest 106 and extending onto the top surface of the head rest 108, a lower extent 114 extending below the sitting portion 104, and an intermediate extent 116 positioned over the sitting portion 104, the sheet further including front 38 and back 40 surfaces and opposing side edges 118, the back surface 40 in contact with the airline seat 102, whereby the front surface 38 creates a sanitary or semi-sanitary area/barrier for the airline passenger. The sheet includes a pair of arm protectors 28, 30, each arm protector extending laterally from one of the opposing side edges 118 of the paper sheet 110, each arm protector further including peripheral side edges 120, the side edges being draped over the armrests 44, 46 of the airline seat 102.

As shown in FIGS. 1, 2, 6, 7, 9, 10, and 13, an adhesive 14 is formed along the back surface 40 of the paper sheet 110 proximate to the upper extent 112, the adhesive 14 being releasably secured to the headrest 108 of the airline seat, whereby the paper sheet 110 can be subsequently removed without damaging the airline seat 102. Further, a pocket 18 is positioned along the lower extent 114 of the paper sheet 110 for accommodating a bottle or packet of hand sanitizer or sanitary wipe positioned within the pocket.

Figure 12:
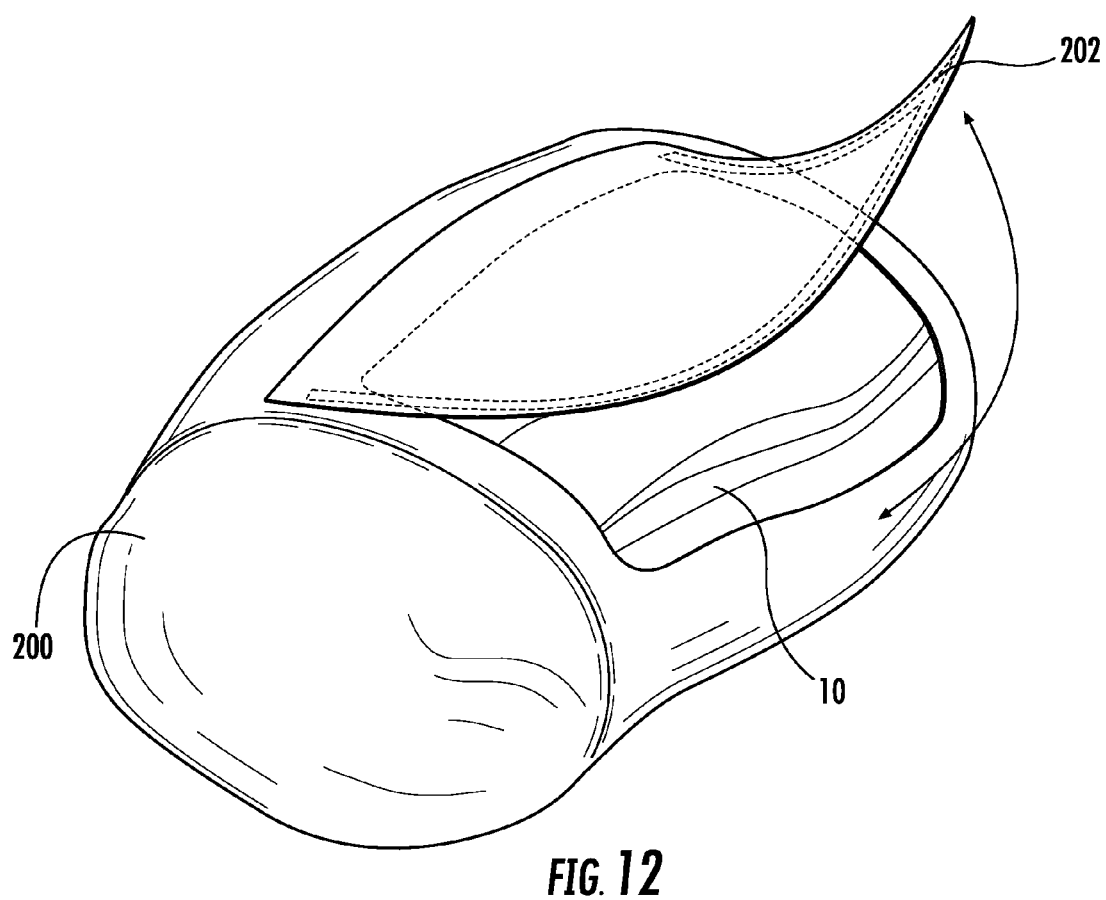
FIG. 12 is a perspective view of one kit containing a seat cover according to the teachings of the present inventions.

FIG. 12 depicts a kit styled embodiment of the seat cover 10 as herein described folded into a compact form for carrying in a small pouch 200 prior to use. The pouch 200 may be small enough to fit in a passenger's pocket or luggage for ease of transport. Further, the pouch may include a flap 202 that is at least partially detached from the pouch in order to access the associated cover 10. A sanitary wipe or solution may also be attached to an exterior portion of the pouch. Alternatively, the seat cover 10 is folded into a pouch that is integral with, connected to, or part of, the seat cover.

Ideally, the seat cover 10 is folded into the pouch 200 in such a way that subsequent attachment to a seat is simple and convenient. For example, the seat cover 10 may be folded such that the adhesive strip 14 is accessible immediately after opening the pouch 200. Such a configuration permits the user to first attach the adhesive strip 14 to the top of the seat's headrest prior to unfolding the remainder of the seat cover 10.

Accordingly, a method for attaching a seat cover to an airline seat may include the steps of:
  i. opening a pouch containing a disposable seat cover;
  ii. removing the disposable seat cover from the pouch;
  iii. exposing an adhesive strip;
  iv. attaching the adhesive strip to a top of the seat;
  v. unfolding the disposable seat cover in such a way that the seat cover substantially covers the seat; and
  vi. attaching a pair of arm protectors to a pair of armrests, wherein the arm protectors are integral with the disposable seat cover.

Another embodiment of the method disclosed herein includes removing at least one of a sanitary wipe and a solution from a pocket or pouch and sanitizing at least one surface.

Yet another embodiment of the method disclosed herein includes the steps of:
  i. exposing an attachment portion;
  ii. positioning the attachment portion to removeably attach to a top of the seat;
  iii. unfolding the disposable seat cover in such a way that the seat cover substantially covers the seat; and
  iv. positioning at least one arm protector to at least partially cover at least one armrest.

The embodiments of the seat cover disclosed herein may be constructed from a variety of materials, including nonwoven materials, medical fabrics such as the Gore® medical fabrics, coated paper or other materials that are disposable, lightweight, and water resistant or water repellant. The paper or laminated paper material may comprise woven fibers or a material similar to that used in medical gowns, shoe covers, and disposable face masks that is easily folded and compactable for storage in a small portable pouch.

Further, the seat covers disclosed herein may provide a surface for advertising, such as by way of a printed indicia, such as a logo, slogan, or announcement displayed on the seat cover. Accordingly, a method for advertising may include:
  i. displaying an indicia on a disposable seat cover, wherein the disposable seat cover includes any one of the embodiments disclosed herein;
  ii. exposing an adhesive strip on the seat cover; and
  iii. attaching the seat cover to a seat.

Additional features may also be included in embodiments disclosed herein, including a reinforced aperture or slit for receiving a seat belt, whereby the reinforced portion prevents tearing and/or stretching of the seat cover at a point of contact with the seat belt. The embodiments disclosed may also comprise a dedicated pouch or sleeve for a personal electronic device or personal article, such as, for example, a cellular telephone, smart phone, tablet computer, laptop computer, portable media player, and the like. A pouch or sleeve may also be used to store a magazine, newspaper, or book. In one embodiment, the pouch or sleeve is located on an armrest portion of the seat cover. However, other positions and orientations are considered to be within the scope of the present disclosure, including proximate the headrest portion, proximate the intermediate sitting portion, or proximate the lower portion.

Further envisioned is the inclusion of an armrest portion defining at least one aperture for accessing seat recliner controls and/or entertainment-related controls, including volume and channel controls, and/or a headphone jack, present as part of the seat's armrest. Alternatively, a clear window portion may be provided as part of the seat cover's armrest portion that permits a user to view the controls, yet still provides a barrier to direct contact between a user and the controls.

Figure 13:
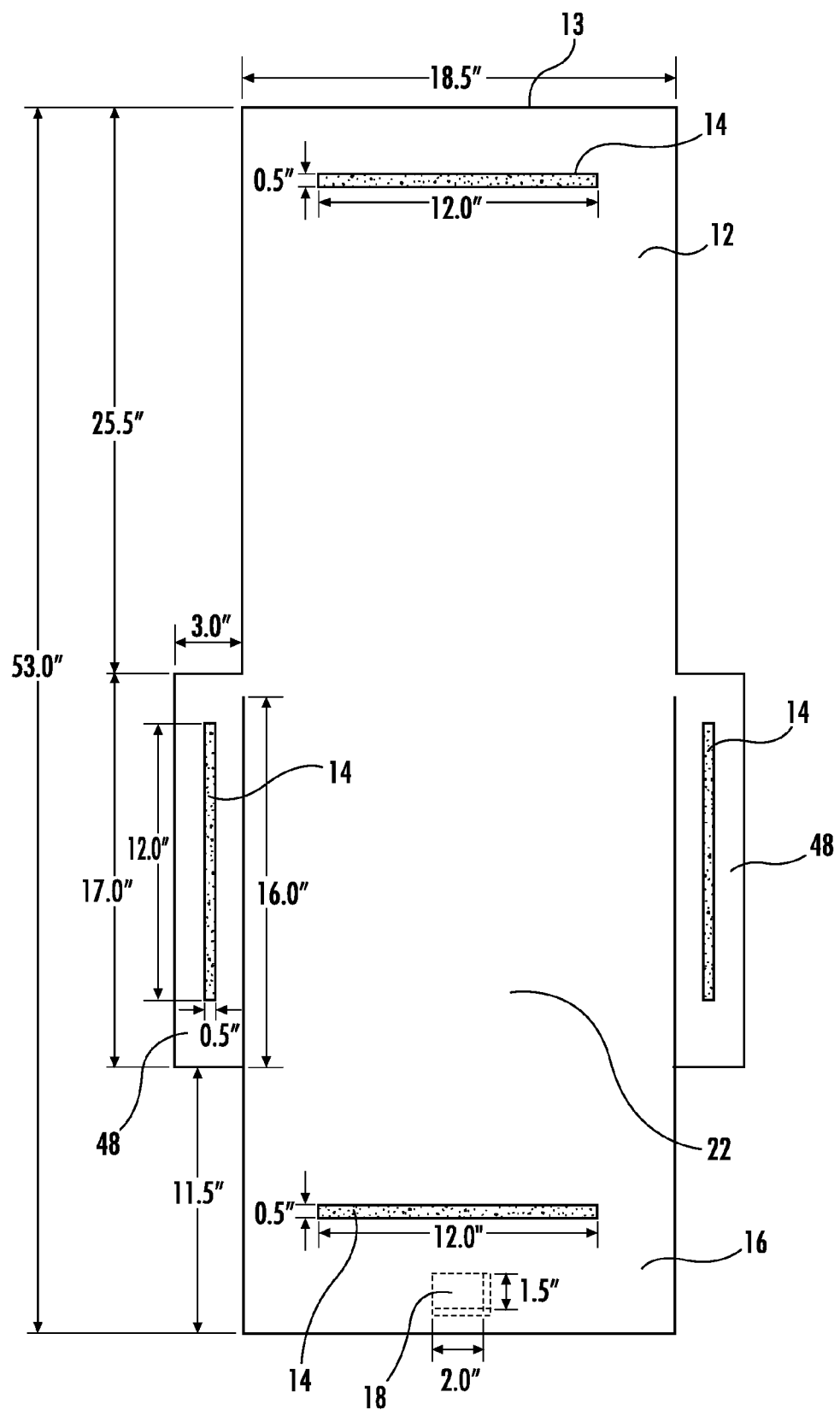
FIG. 13 is a schematic depiction of an embodiment of the present disclosure.

The embodiments disclosed herein may be dimensioned to best suit the needs of a typical airline traveler by maximizing the extent to which the seat cover prevents contact with an airline seat. By way of example, and as depicted in FIG. 13, a width of at least one of the upper portion 12 and the lower portion 16 may be about 18.5 inches wide. The upper portion 12 may be about 22.5 inches long, the intermediate portion 22 may be about 17 inches long, and the lower portion 16 may be about 11.5 inches long. The total length of the seat cover may be about 53 inches. An adhesive strip 14 proximate the upper portion 12 may be about 12 inches long by about 1 inch wide. The arm protectors may be about 17 inches in length and about 3 inches wide, and may include an adhesive of about 12 inches long by about 1 inch wide. The pocket 18 may be about 2 inches by about 1.5 inches. The dimensions defined herein are merely exemplary, and other dimensions are considered to be within the scope of the present disclosure.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A seat cover comprising:
an elongate body portion with a front surface for contacting a user and a back surface for contacting a seat, the elongate body portion including an upper portion defining a linear terminal edge having a width dimension substantially equivalent to a width dimension of the seat, a lower portion opposite the upper portion, and an intermediate portion therebetween, the upper portion, the lower portion, and the intermediate portion each defining a left side and a right side, the elongate body portion removeably connectable to the seat;
a pair of arm protectors having an arm protector length, the arm protectors extending laterally from the elongate body portion, wherein each arm protector is connected to the elongate body portion by a section having a length less than the arm protector length, the arm protectors each adapted for covering at least a portion of an armrest of the seat;
a pocket defined by at least a portion of the front surface and located proximate the lower portion; and
a sanitizer disposed within the pocket;
wherein the linear terminal edge extends between the left side and the right side of the upper portion, and wherein the linear terminal edge is devoid of any protrusion therefrom.

2. The seat cover of claim 1, wherein the linear top edge does not extend rearward beyond a top surface of the seat when removeably connected thereto.

3. The seat cover of claim 2, wherein the pair of arm protectors extend laterally from the left side and the right side of at least one of the upper portion and the intermediate portion, respectively, the arm protectors each having a top extent, a bottom extent, and a side extent therebetween.

4. The seat cover of claim 3, wherein the top extents are generally parallel to the bottom extents, and wherein the side extents are generally perpendicular to both the top extents and the bottom extents, the side extents generally parallel to the left and right sides of the intermediate portion.

5. The seat cover of claim 4, further comprising an adhesive strip integral with the back surface and proximate the upper portion, the adhesive strip comprising an adhesive for binding the seat.

6. The seat cover of claim 1, wherein the pocket is positioned at a center of the lower portion.

7. The sheet of claim 1, wherein the arm protector has a tubular shape for encompassing the armrest.

8. A system useful in an airplane, the system comprising:
a seat comprising a lower sitting portion, a backrest, a headrest, and opposing armrests, the headrest including a front, back, and top surface, wherein the seat is adapted for accommodating an airline traveler;
a disposable sheet adapted to be positioned over the seat, the sheet comprising:
an upper extent positioned over the backrest, the upper extent having a left side and a right side and defining a linear terminal edge having a width dimension substantially equivalent to a width dimension of the headrest, the sheet further comprising an intermediate extent positioned over the sitting portion, front and rear surfaces, and opposing side edges, the back surface in contact with the seat, the front surface creating a sanitary area for the airline traveler;
at least one arm protector having an arm protector length, wherein the at least one arm protector is connected to the disposable sheet by a section having a length less than the arm protector length, the at least one arm protector extending laterally from one of the opposing side edges of the sheet, each arm protector further including peripheral side edges, the side edges being draped over the armrests of the airline seat; and
a removable attachment means formed along the back surface of the sheet proximate to the upper extent, the removable attachment means being releasably secured to the headrest of the airline seat, wherein the sheet can be removed without damaging the seat.

9. The system of claim 8, further comprising a lower extent extending below the sitting portion.

10. The system of claim 9, further comprising a pocket positioned along the lower extent of the disposable sheet and a sanitizer placed within the pocket.

11. The system of claim 10, wherein the disposable sheet further comprises a second pocket adapted for receiving a personal article.

12. The system of claim 11, wherein the personal article includes a personal electronic device.

13. A sheet adapted to be positioned over an airline seat with at least one armrest, the sheet comprising:

an upper extent, a lower extent, and an intermediate extent therebetween, the sheet further including front and rear surfaces and opposing side edges, the back surface in contact with the airline seat, whereby the front surface creates a sanitary area for the airline passenger, the upper extent defining a linear top edge having a width substantially the same as a width of the airline seat;

at least one arm protector having an arm protector length, wherein the at least one arm protector is connected to the intermediate extent by a section having a length less than the arm protector length, the at least one arm protector extending laterally from one of the opposing side edges of the sheet, each arm protector further including peripheral sides edges, the side edges being draped over the armrests of the airline seat; and an adhesive formed along the back surface of the sheet proximate the linear top edge, the adhesive being releasably secured to the airline seat at a top surface thereof, the sheet removable from the seat without damage thereto.

14. The sheet of claim 13, further comprising an adhesive formed along a portion of the at least one arm protector, the adhesive adapted for engaging the at least one armrest.

15. The sheet of claim 14, further comprising a sanitizer removeably attached to the sheet.

16. A kit comprising:
a pouch; and
a disposable sheet housed within the pouch, the disposable sheet adapted to be positioned over an airline seat with at least one armrest, the sheet comprising:
an upper extent, a lower extent, and an intermediate extent therebetween, the sheet further including front and rear surfaces and opposing side edges, the back surface in contact with the airline seat, whereby the front surface creates a sanitary area for the airline passenger;
at least one arm protector having an arm protector length, wherein each arm protector is connected to the sheet by a section having a length less than the arm protector length, the at least one arm protector extending laterally from one of the opposing side edges of the sheet, the at least one arm protector further including peripheral sides edges, the side edges being draped over the at least one armrest of the airline seat;
an attachment means formed along the back surface of the sheet proximate the upper extent, the attachment means being releasably secured to the airline seat, the sheet removable from the seat without damage thereto; and
at least one of a sanitary wipe and a sanitary solution either placed in the pouch or removeably attached thereto.

17. A method for attaching a seat cover to an airline seat, the method comprising:
exposing an attachment portion;
positioning the attachment portion to removeably attach to a top of the seat in such a way that the seat cover does not extend rearward beyond a top surface of the seat;
unfolding the seat cover in such a way that the seat cover substantially covers the seat; and
positioning at least one arm protector to at least partially cover at least one armrest, wherein the at least one arm protector defines an arm protector length, and wherein the at least one arm protector is connected to the seat cover by a section having a length less than the arm protector length.

18. The method of claim 17, further comprising:
removing at least one of a sanitary wipe and a sanitary solution from a pouch and sanitizing at least one surface.

* * * * *